3,741,920
MANUFACTURE OF THERMAL SHOCK RESISTANT FOAMS
Franz Weissenfels, Siegburg am Grafenkreuz, and Hans Jünger, Troisdorf, Germany, assignors to Dynamit Nobel Aktiengesellschaft, Troisdorf, Germany
No Drawing. Continuation-in-part of application Ser. No. 31,418, Apr. 23, 1970. This application Feb. 28, 1972, Ser. No. 230,089
Claims priority, application Germany, Apr. 24, 1969, P 19 20 867.4
Int. Cl. C08j 1/26, 1/22
U.S. Cl. 260—2.5 FP    6 Claims

ABSTRACT OF THE DISCLOSURE

A phenolic foam having improved resistance to fire, heat and abrupt changes in temperature is prepared by foaming and hardening an intimate mixture of (a) a conventional foamable phenolic resole resin containing a blowing agent, a hardener and a surface active agent, and
(b) in the range of 2 to 20 weight percent, based on the phenolic-resin, of a flowable hydroxyalkylated phenol.

---

This application is a continuation-in-part of application Ser. No. 31,418, filed Apr. 23, 1970, now abandoned.

PRIOR ART

Phenolic resin foams have a low flammability and are used as thermal insulating materials. The action of flame does not melt or soften them unless the flame is accompanied by a copious supply of air or oxygen, in which case smoldering or sometimes combustion can take place. Also, a coking of phenolic resin foams is possible under a relatively long exposure to flame.

When a flame acts on a phenolic resin foam, one disadvantageous effect is that frequently small particles break out the surface of the foam in and around the cone of the flame. This occurs especially in finely porous phenolic resin foams whose pore diameter is less than 0.2 mm. The particles that break out may be polyhedral, such as spherical or discoidal, which particles are often burned incompletely or not at all. This erosive action can continue, if the flame is applied for long periods, until the entire thickness of a board of phenolic resin has been ablated in the area of the flame.

Boron compounds have been added to phenolic resin foams which cause them to burn much more slowly under the action of fire, but the addition of these compounds is capable of exerting no noticeable effect on the erosive process described above.

It has also been proposed to add finely divided fillers to the foaming phenolic resins for the purpose of controlling this erosive process. These fillers include ground walnut shells, expanded clay, unsaturated polyester resins, unsaturated polymerizable monomers such as styrene, furfuryl alcohol, polyvalent alcohols such as propylene glycol, sugar, or starch, esters of phosphoric or phthalic acid, and condensation products of phenols, aldehydes and ketones. The additives, however, have little or no effect on the erosive process.

THIS INVENTION

The present invention is concerned with a process for the manufacture of phenolic resin foam materials having improved thermal shock resistance. The phenolic resin foams made by this process have an improved resistance to the action of fire, heat and great and abrupt changes of temperature.

This improved process can be carried out in open or closed molds, using intimate mixtures consisting of a conventional phenolic resole resin with known solid or liquid blowing agents, liquid or solid hardeners and small amounts of surface active agents. The process is characterized by the fact that hydroxyalkylated phenols are added to the mixtures prior to the foaming in quantities of about 8 to 20 percent, and preferably about 10 to 15 percent, of the weight of the phenolic resole resin.

The addition of the hydroxyalkylated phenols to the phenolic resole resins is performed, along with the addition of the blowing agent and the hardener, prior to the foaming operation. The technique of this invention is particularly useful when the pore diameter resulting from the cell regulator is to be less than about 0.9 mm., and especially when it is less than 0.2 mm., in 95 percent of all of the cells in the foam. The flame-erosion phenomenon takes place mainly in phenolic resin foams having this size of pores.

The phenolic resin foams produced in this manner resist the action of fire and of abrupt and great temperature changes much better than any phenolic resin foam produced by methods of the prior art.

The hydroxyalkylated phenol additive

The term hydroxyalkylated phenol is intended to mean addition products of phenol, or one of its homologs, and an alkylene oxide. Ethylene oxide, propylene oxides, butylene oxides or the pentylene oxides can be used as alkylene oxides; with ethylene oxide being preferred.

The hydroxyalkylated phenols are prepared by adding to an alkalinized phenol or one of its homologs a quantity of an alkylene oxide corresponding to the desired degree of hydroxyalkylation. The two reactants are then heated to a temperature between 90° and 150° C. After this temperature is reached, the addition reaction proceeds without more. In the case of gaseous alkylene oxides (e.g., ethylene oxide) or those boiling up to 120° C., the reaction is performed in a pressure vessel. Phenols substituted on the phenolic OH group with the desired number of hydroxyalkyl radicals are thus formed.

The term phenols is intended to mean both phenol and its homologs (e.g., resorcinol or pyrocatechol) or methyl-substitution products, such as the cresols.

Particularly good results in the prevention of the above-described erosion that takes place in phenol resin foams under thermal stress are achieved by the use of hydroxyethylated phenol having an average degree of hydroxyethylation between 3 and 12, or of hydroxyethylated nonyl phenol having an average degree of hydroxyethylation of 8 to 14.

The average degree of hydroxyalkylation of about 3 to 12 means that the hydroxyalkylated phenol on an overall basis contains about 3 to 12 moles of alkylene oxide per mole of phenol, although individual molecules may contain more than 12 or less than 3 moles of alkylene oxide per mole of phenol.

The higher the degree of hydroxyethylation of the phenol is, the more viscous the hydroxyethylation product becomes. As long as the hydroxyalkylated phenol has a viscous consistency, i.e. is flowable at the mixing temperatures, usually 0° to 100° C., it can be used according to the invention. The degree of hydroxyalkylation at which this viscous consistency is obtained depends, of course, on the starting products that are used. In the case of hydroxyethylated phenol, fluid or viscous compounds that can be used according to the invention are obtained up to a hydroxyalkylation degree of 12; in the case of a hydroxyethylated nonyl phenol, the limit is a hydroxyalkylation of 14.

The quantity of hydroxyalkylation products added can vary between 5 and 20 percent of the weight of the phenolic resole resin. Particularly good results are achieved with additions amounting to between 10 and 15 percent of the weight of the phenolic resole resin.

The phenolic resole resin mixture

Phenolic resole resins suitable for the manufacture of the phenolic resin foams according to the invention are obtained, for example, by condensing one mole of a phenol with 1 to 3 moles of an aldehyde in an alkaline medium, then removing the water by vacuum distillation down to a solid resin content of 60 to 80 percent, preferably 70 to 80 percent, and, if necessary, adjusting the pH to a value greater than 4. Usable phenols include both phenols and their homologs such as the cresols and resorcinol, xylenols, or mixtures of these compounds. The aldehydes which can be reacted with the phenols include formaldehyde, compounds which decompose to formaldehyde, such as paraformaldehyde, acetaldehyde, furfurol and hexamethylene tetramine, etc., and mixtures of these compounds.

The condensation is usually performed in an aqueous alkaline medium.

The compounds used as blowing agents include solid compounds from which non-reactive gases, preferably carbon dioxide, are liberated under the conditions of the reaction, such as the alkali carbonates and bicarbonates, and also low-boiling organic solvents.

Liquid blowing agents include low-boiling organic solvents such as chloroform, carbon tetrachloride, chlorofluoromethane, n-pentane, n-butyl ether, petroleum ether, ethylene dichloride.

The solid blowing agents are used in quantities amounting to 0.3 to 10 percent of the weight of the phenolic resole resin. The liquid blowing agents are added in quantities amounting to between 1.0 and 20.0 percent of the weight of the phenolic resole resin.

Both liquid and powdered solid acids can be used as hardeners. The quantity depends in part on the blowing agent used. If the blowing agent consists of a solid salt that yields gases, a portion of the acid can be used for the purpose of causing liberation of the gases. If low-boiling solvents are used as blowing agents, the percentage of hardener is accordingly lower. Suitable water-soluble acids are the mineral acids (HCl, $H_2SO_4$) and sulfonic acids having good solubility in water, in which the sulfonic acid group is directly linked to an aromatic ring, substituted as desired. Examples are: benzenesulfonic acid, p-toluene-sulfonic acid, chlorobenzene-3,5-disulfonic acid, the o-, m- and p-cresolsulfonic acids. The sulfonic acid group can also be joined to a polynuclear aromatic radical, as in the case, for example, of the naphthenesulfonic acids or the naphthylaminesulfonic acids. Aliphatic sulfonic acids can also be used as hardeners, examples being butylsulfonic acid, propylsulfonic acid and hexylsulfonic acid.

The aqueous solutions of these acids are in most cases solutions of 30 to 50 percent by weight. A number of acids, such as p-toluenesulfonic acid, can also be used in powdered form as hardeners. The amount of hardener used is between 1.0 and 15.0 percent, figured as 100 percent acid, of the weight of the phenolic resole resin.

The surface active agents are used in quantities of 0.4 to 8 percent, preferably 1 to 5 percent, of the weight of the phenolic resole resin. The surface active agent is essential for producing the desired cell structure as described more fully in application Ser. No. 510,088, filed Nov. 26, 1965, now pending. Suitable surface active agents are, for example, polyethylene ethers of a long-chained monofatty acid ester of sorbitol, e.g., the polyethylene ether of monooleic sorbitol ester and water-soluble ethoxylated castor oil.

According to the description of the Ser. No. 510,088 the pore structure is changed when adding alkyl-substituted oxalkylated phenols, as e.g. nonyl-phenol; such modification being characterized by the fact that with increasing quantities of this surface active agent the cellular structure is changed as larger cells develop. Yet, when using greater quantities of the oxalkylated phenols as per the present invention which are *not* substituted, this effect does not occur.

Preparation of foam

The manufacture of the foams is generally performed by thoroughly mixing a phenolic resole resin with liquid or solid hardeners, surface active substances, a blowing agent, and the hydroxyalkylated phenols added according to the invention, and foaming and hardening the mixture in open or closed vessels.

The foaming of the phenolic resin is performed after the individual components have been mixed together, the blowing agent being transformed to the gaseous state. Depending on the composition of the mixture to be foamed, the foaming takes place at temperatures between 0° and 100° C., preferably at 15° to 60° C. The resin can be foamed either in open or in closed molds to produce bodies of a shape corresponding to the shape of the open or closed mold selected.

It is also possible to perform the foaming process continuously in a double band press. In this case the components are proportioned and mixed by means of a known automatic proportioning and mixing apparatus, and the mixture is fed continuously to the bands of a double band press by means of a charging device moving crosswise to the direction of movement. Then the mixture is passed through a gap of selectable thickness formed between one roll and a support which may, if desired, also be a roll. The rolls can be preheated if desired. By this process boards of selectable thickness are obtained.

The hardening is generally so controlled that, as soon as the desired foam volume is reached, the foam structure has solidified to such an extent as to forestall collapse.

Prior to the foaming, fillers and/or pigments of the prior are can be added to the phenolic resole resin, examples being inorganic or organic substances in powder form which contain air or are porous, and titanium dioxide.

It is furthermore possible to use modified phenolic resole resins for the production of the phenolic resin foam materials according to the invention. Examples of modifying agents are: furfurol, furfuryl alcohol, unsaturated hydrocarbons, saturated and unsaturated esters and polyesters and ketones such as acetone.

The solid resin content of the phenolic resole resin is determined in the following manner: 2 g. of the resole is heated for 90 minutes in an iron dish at 150° C.; then the residue is weighed.

EXAMPLES

Two phenolic resole resins A and B were prepared in the manner described below, and then thoroughly mixed with different amounts of blowing agent, hardener and hydroxyethylated phenol.

Resin A 143 parts by weight of phenol are condensed with 228 parts of a 30 percent aqueous formaldehyde solution with the addition of 0.715 part of sodium hydroxide in aqueous solution at 100° C. for 70 minutes. The reaction mixture obtained is then vacuum distilled down to a solid resin content of 72 to 78 weight percent. A castor oil made water-soluble by ethoxylation, and having an average ethoxylation degree of 40, is added in a quantity amounting to 3 percent of the weight of the phenolic resole resin, to serve as the surface active compound for cell or pore regulation. The resin thus made has at 20° C. a viscosity of 4000 to 7000 centipoises according to Höppler.

Resin B 143 parts by weight of phenol are condensed with 243 wt.-parts of a 3 percent aqueous formaldehyde solution with the addition of 4.3 parts of sodium hydroxide in aqueous solution, at 100° C. for 50 minutes. The reaction mixture obtained is vacuum distilled down to a solid resin content of 70 to 75 weight percent and then 3 weight percent of the cell regulator described under "Resin A" is added. The resin then has a viscosity at room temperature of 3000 to 5000 cps.

Phenolic resole resin B was mixed with the amounts listed in Table 1 of the hardener I or III described below, with n-pentane as blowing agent, plus hydroxyethylated phenol having an average hydroxyethylation degree of 6. The foaming was performed by pouring the intimate mixture of the components into a box mold having a bottom area of 50 cm. x 50 cm. and a height of 100 cm., which was opened at the top. The foaming was performed with simultaneously increasing solidification at 40° to 70° C. within 30 to 90 minutes. After about 120 minutes the hardened foam blocks could be stripped from the mold. After they had completely cooled they were cut into slabs.

The conditions of manufacture and the properties of the finished phenolic resin foams are listed in Tables 1 and 2. Examples 1, 4, 7 and 10 are examples for the sake of comparison, in which a hydroxyethylated phenol was not added. The compressive strength was determined according to DIN 53, 421. The thermal pretreatment was also performed, because it is known that thermally pretreated phenolic resin foam slabs display the above-described erosion to a greater degree than non-pretreated phenolic resin foam slabs. The specimens were therefore The performance of the foam specimens under flame was judged as follows:

Slabs 30 mm. thick and 20 x 30 cm. in size were cut from the foam blocks. Specimens of the same size and thickness were also prepared from the continuously manufactured product. The covering bonded onto the latter specimens (in the manufacturing process) was removed before the flame test and before heat treatment. For the flame test, the specimens were clamped horizontally by means of a clamping device at such a height over a Bunsen burner that the tip of the inside flame cone was about 2 cm. under the bottom of the specimen, the flame being full and non-luminous. The results of the flame tests were evaluated in two ways:

(1) Observation of foam surface for the erosion of unburned or incompletely burned particles of foam in the flame zone.

(2) Measurement of the time required for the Bunsen burner flame to burn through the 30 mm. thick foam slabs.

The following hardeners were used in the experiments:

Hardener I:
   100 parts by weight of glycol
   100 parts by weight of hydrochloric acid (37%) solution Hardener II: p-toluenesulfonic acid, dissolved in dilute aqueous sulfuric acid Hardener III: Mixture of p-toluenesulfonic acid and boric acid, very finely pulverized.

TABLE 1

| Example | [1]1 | 2 | 3 | [1]4 | 5 | 6 |
|---|---|---|---|---|---|---|
| Resin B, wt.-parts | 100 | 100 | 100 | 100 | 100 | 100 |
| Surface active agent, wt.-parts | 3 | 3 | 3 | 3 | 3 | 3 |
| n-Pentane, wt.-parts | 4.2 | 4.2 | 4.2 | 6.0 | 6.0 | 6.0 |
| Hardener | I | I | I | III | III | III |
| Hardener, wt.-parts | 11.4 | 11.4 | 11.4 | 30.0 | 30.0 | 30.0 |
| Hydroxyethylated phenol,[2] wt.-parts | | 12.5 | 12.5 | | 12.5 | 12.5 |
| Thermal pretreatment | Yes | No | Yes | Yes | No | Yes |
| Density, g./cm.[3] | 0.055 | 0.058 | 0.058 | 0.058 | 0.060 | 0.060 |
| Compressive strength (kp./cm.²) | 2.8 | 2.6 | 2.6 | 3.0 | 2.8 | 2.8 |
| Erosion in flame | (3) | (4) | (4) | (5) | (4) | (4) |
| Burn-thru time | 5'48" | 8'26" | 8'01" | 8'22" | 18'21" | 17'04" |

[1] Comparative examples.
[2] Average hydroxyethylation degree=6.
[3] Great.
[4] None.
[5] Little.

TABLE 2

| Example | [1]7 | 8 | 9 | [1]10 | 11 | 12 |
|---|---|---|---|---|---|---|
| Resin A, wt.-parts | 100 | 100 | 100 | 100 | 100 | 100 |
| Surface active agent, wt.-parts | 3 | 3 | 3 | 3 | 3 | 3 |
| n-Pentane, wt.-parts | 6.0 | 6.0 | 6.0 | 5.5 | 5.5 | 5.5 |
| Hardener | II | II | II | III | III | III |
| Hardener, wt.-parts | 12.0 | 12.0 | 12.0 | 28.0 | 28.0 | 28.0 |
| Hydroxyethylated phenol,[2] wt.-parts | | 12.5 | 12.5 | | 12.5 | 12.5 |
| Thermal pretreatment | Yes | No | Yes | Yes | No | Yes |
| Density, g./cm.[3] | 0.051 | 0.055 | 0.055 | 0.056 | 0.057 | 0.057 |
| Compressive strength (kp./cm.²) | 3.1 | 3.2 | 3.2 | 2.7 | 2.5 | 2.5 |
| Erosion by flame | (3) | (4) | (4) | (5) | (4) | (4) |
| Burn-thru time | 4'37" | 7'16" | 6'57" | 8'14" | 13'42" | 13'03" |

[1] Comparative examples.
[2] Average hydroxyethylation degree=6.
[3] Very great.
[4] None.
[5] Little.

maintained for 24 hours at 50° C. in the case of pretreatment.

Table 2 shows the characteristics of continuously manufactured phenolic resin foam slabs. Their manufacture was performed by proportioning and mixing the components listed in the table in the stated ratios, using conventional automatic proportioning and mixing apparatus. This mixture was then continuously fed between the bands of a double band press, these bands being heated to about 50° C. After a residence time of about 12 minutes between the moving bands, the foamable mixtures filled up the anticipated volume. The endless slab emerging from the double band press was cut into individual pieces by a cross-cut saw.

What is claimed is:

1. In a process for the manufacture of phenolic resin foams having an average cell diameter up to about 0.9 mm. wherein a mixture of a phenol formaldehyde resole resin, a blowing agent, a hardener, and a small amount of a surface active agent are caused to form a solid foam the improvement leading to a foam of improved thermal shock resistance comprising adding to said mixture prior to foaming thereof a hydroxyalkylated phenol in an amount in the range of 8 to 20 weight percent based on said phenol formaldehyde resin, said hydroxyalkylated phenol being the reaction product of phenol, resorcinol or pyrocatechol with about 3 to 12 times the molar amount of ethylene oxide.

2. The process according to claim 1 wherein said surface active agent is selected from the group consisting of oxalkylated nonyl-phenol and/or water-soluble ethoxylated castor oil and is present in about 1 to 5 weight percent based on said phenol formaldehyde resole resin.

3. The process of claim 1 wherein said hydroxyalkylated phenol is added in about 10 to 15 weight percent based on said phenol formaldehyde resole resin.

4. A phenolic foam having improved resistance to fire, heat and abrupt changes in temperature prepared by foaming and hardening an intimate mixture comprising essentially:
  (a) a conventional foamable phenolic resole resin containing a blowing agent, a hardener and a surface active agent, and
  (b) in the range of 8 to 20 weight percent, based on the phenolic resole resin content of said mixture, of a flowable hydroxyalkylated phenol, said hydroxyalkylated phenol being the reaction product of phenol, rescorcinol or pyrocatechol with about 3 to 12 times the molar amount of ethylene oxide.

5. A phenolic foam according to claim 4 wherein said surface active agent is selected from the group consisting of oxalkylated phenol and/or water-soluble ethoxylated castor oil and is present in about 1 to 5 weight percent based on said phenol formaldehyde resole resin.

6. A phenolic foam according to claim 5 wherein said hydroxyalkylated phenol is present in the mixture to the extent of about 10 to 15 weight percent based on the phenol formaldehyde resole resin.

References Cited

UNITED STATES PATENTS

| | | | |
|---|---|---|---|
| 2,933,461 | 4/1960 | Mullen | 260—2.5 F |
| 2,979,469 | 4/1961 | Shannon et al. | 260—2.5 F |
| 3,298,973 | 1/1967 | Quarles et al. | 260—2.5 F |
| 3,389,094 | 6/1968 | D'Alesandro | 260—2.5 F |
| 3,389,095 | 6/1968 | Garrett | 260—2.5 F |
| 3,511,789 | 5/1970 | Shannon et al. | 260—2.5 F |

OTHER REFERENCES

"Patent Review on Soaps, Detergents and Emulsifiers," vol. 1, 1966, copyright 1966, pp. 52 and 53, by McCutchen.

JOHN C. BLEUTGE, Primary Examiner

M. FOELAK, Assistant Examiner

U.S. Cl. X.R.

260—2.5 F, 19 N, 45.95, DIG. 24